(12) United States Patent
Wang et al.

(10) Patent No.: US 10,356,135 B2
(45) Date of Patent: Jul. 16, 2019

(54) CATEGORIZING STORIES IN A SOCIAL NETWORKING SYSTEM NEWS FEED

(71) Applicant: Facebook, Inc., Menlo Park, CA (US)

(72) Inventors: Xiao Ou Wang, San Francisco, CA (US); Chris Struhar, San Francisco, CA (US); Robert William Cathcart, San Francisco, CA (US); Robyn David Morris, San Francisco, CA (US); Laney Kuenzel, Stanford, CA (US)

(73) Assignee: Facebook, Inc., Menlo Park, CA (US)

( * ) Notice: Subject to any disclaimer, the term of this patent is extended or adjusted under 35 U.S.C. 154(b) by 677 days.

(21) Appl. No.: 13/747,112

(22) Filed: Jan. 22, 2013

(65) Prior Publication Data
US 2014/0207860 A1 Jul. 24, 2014

(51) Int. Cl.
| H04L 29/06 | (2006.01) |
| H04L 29/08 | (2006.01) |
| G06Q 10/10 | (2012.01) |
| G06Q 50/00 | (2012.01) |

(52) U.S. Cl.
CPC .......... *H04L 65/403* (2013.01); *G06Q 10/10* (2013.01); *G06Q 50/01* (2013.01); *H04L 67/22* (2013.01); *H04L 67/306* (2013.01)

(58) Field of Classification Search
CPC ....................................................... H04L 12/67
USPC ......................................................... 709/204
See application file for complete search history.

(56) References Cited

U.S. PATENT DOCUMENTS

| 2008/0040673 | A1* | 2/2008 | Zuckerberg | ........... | H04L 67/306 715/745 |
| 2011/0179020 | A1* | 7/2011 | Ozzie | .................... | G06F 16/958 707/723 |
| 2012/0042280 | A1* | 2/2012 | Hoffman | ............ | G06Q 30/0251 715/800 |
| 2012/0110071 | A1 | 5/2012 | Zhou et al. | | |
| 2012/0143963 | A1* | 6/2012 | Kennberg | ............ | G06Q 10/107 709/206 |
| 2012/0166532 | A1 | 6/2012 | Juan et al. | | |
| 2012/0331063 | A1 | 12/2012 | Rajaram | | |
| 2013/0031034 | A1 | 1/2013 | Gubin et al. | | |
| 2013/0073632 | A1 | 3/2013 | Fedorov et al. | | |
| 2013/0085859 | A1* | 4/2013 | Sim | ........................ | G06Q 30/02 705/14.58 |
| 2013/0159110 | A1* | 6/2013 | Rajaram | ................ | G06Q 50/01 705/14.66 |

(Continued)

OTHER PUBLICATIONS

U.S. Appl. No. 13/421,786, filed Mar. 15, 2012, Inventors: Schacht et al.

*Primary Examiner* — Kevin T Bates
*Assistant Examiner* — Emad Siddiqi
(74) *Attorney, Agent, or Firm* — Fenwick & West LLP

(57) ABSTRACT

A social networking system generates stories based on actions taken by entities of the social networking system. The system applies a set of rules to the stories to categorize each story and displays the news feed as multiple sections, each displaying a category of generated stories. A story may be categorized according to its content and/or the user associated with the story. In addition to stories about a user's direct connections, stories may be generated by the user's soft connections. Supplemental content may be generated based on a section of the newsfeed currently being accessed and displayed in a related content unit adjacent to a news feed section.

40 Claims, 5 Drawing Sheets

(56) References Cited

U.S. PATENT DOCUMENTS

| | | | |
|---|---|---|---|
| 2013/0031489 A1 | 7/2013 | Gubin et al. | |
| 2013/0246521 A1* | 9/2013 | Schacht | G06Q 50/01 709/204 |
| 2013/0304822 A1* | 11/2013 | Tetreault | H04N 21/2187 709/204 |

* cited by examiner

CATEGORIZING STORIES IN A SOCIAL NETWORKING SYSTEM NEWS FEED

BACKGROUND

This invention relates generally to social networking systems, and in particular to categorizing stories generated for a news feed.

Social networking systems allow their users to share their interests and engage with other users of the social networking systems by sharing photos, real-time status updates, social game updates, and other content items. Additionally, a social networking system may generate stories for its users that describe actions performed by other users. For example, stories generated by the social networking system may describe a variety of actions, including recent moves to a new city, graduations, births, engagements, marriages, and the like, as well as more mundane content such as status messages, information about what music has been listened to by users, and recent check-in events at coffee shops.

As users become more connected with other users and entities on the social networking system, the number of content items provided to the users increases exponentially. Existing social networking systems order content items in reverse chronological order such that newly published content is displayed first. While social networking systems may rank content items based on user interests and affinities for other users, providing a continuous and chronological stream of content items to users may obscure content items and make it more difficult for a user to locate desired content items. This impairment of user experience may result in users becoming less engaged with a social networking system.

SUMMARY

A social networking system generates stories describing actions performed by users of the social networking system. Stories describing actions performed by users connected to a user may be included in a news feed presented to the user. Stories in a news feed of a user are generated for the user and categorized based on the source and/or content of each story, along with actions described by the stories. A news feed is divided into sections that each display one or more categories of stories. A subset of the generated stories describe actions performed by other users or entities directly connected to the user viewing the news feed. For example, a story in the news feed may describe a user and an action. Other stories in the news feed may describe actions associated with users or entities having a soft connection to the user viewing the news feed. For example, stories may be generated for the user from posts by a local business that users connected to the viewing user have checked into, though the viewing user has not liked or checked in at the business.

After being generated, stories are categorized and displayed in sections of the news feed determined based on the category. A story may be categorized based on the user or entity described by the story and/or the content of the story. A news feed section may display one or more stories from one or more designated categories. For example, news feed sections may be designated for stories associated with close friends, local content, community related content, videos, photos, music, games, or other categories. Supplemental content may also be generated based on the categories or topics on which a section is based. Examples of supplemental content include aggregations of actions performed by users connected to the user viewing the news feed. For example, aggregations of actions include an identification of top photos ranked by number of likes and/or comments or an identification of video URLs that are more popular in a user's city than in the user's country. The supplemental content is displayed in a related content unit adjacent to the news feed sections. In one embodiment, the supplemental content changes based on the section of the news feed with which the user has most recently interacted.

Figure 1:
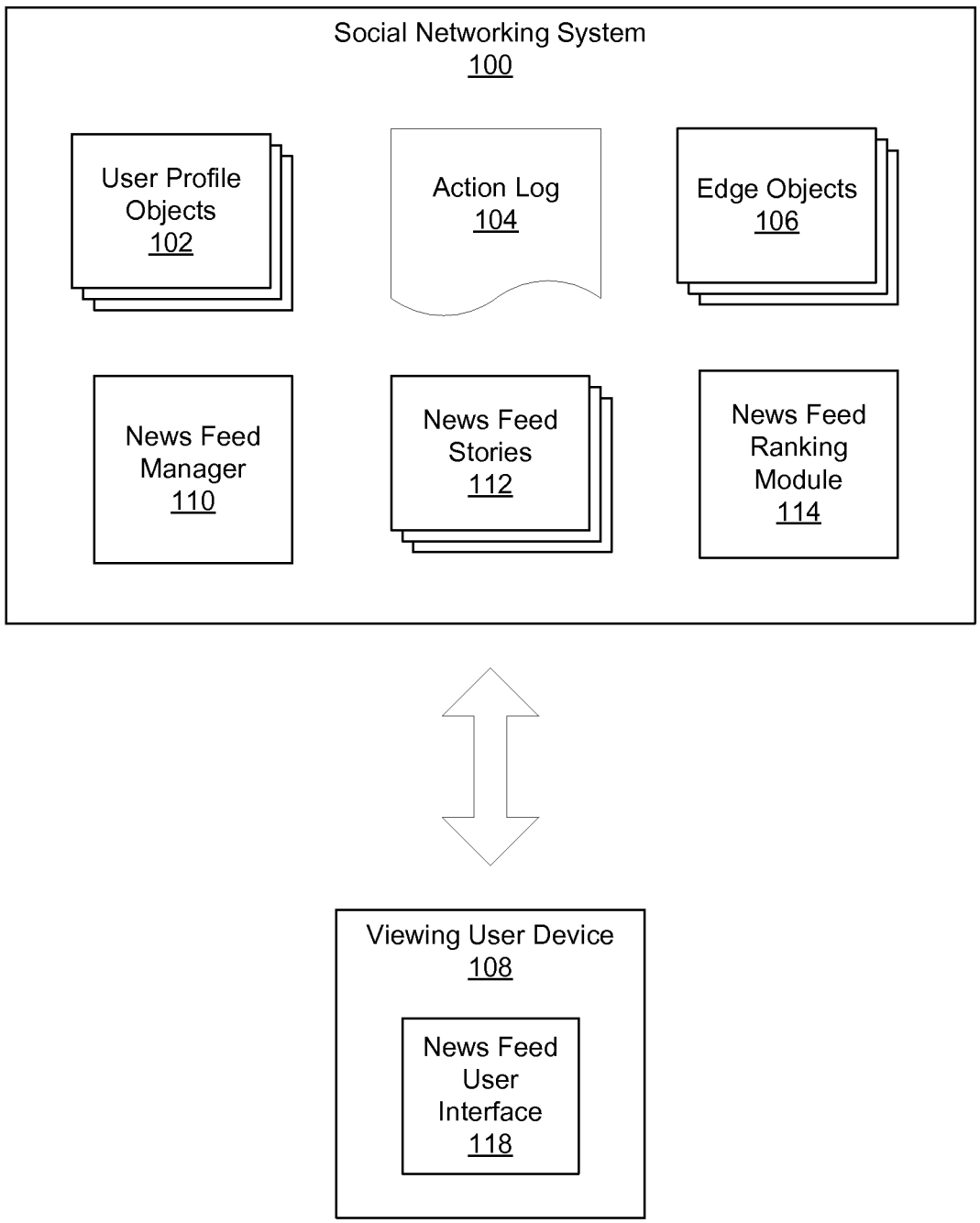
FIG. 1 illustrates a block diagram of a system for categorizing stories for display to users of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to which they desire to be connected. Users of social networking system may provide information describing them which is stored as user profiles. For example, users provide their age, gender, geographical location, education history, employment history and the like. The information provided by users may be used by the social networking system to direct information to the user. For example, the social networking system may recommend groups, events, and connections to other users to a user.

In addition to declarative information provided by users, a social networking systems may also record users' actions on the social networking system. These actions include communications with other users, sharing photos, interactions with applications that operate on the social networking system, responding to a poll, adding an interest, and joining an employee network. A social networking system may also be able to capture external website or application data that is accessed by its users. This external data may include websites that are frequently visited, links that are selected, and other browsing data. Information about users, such as stronger interests in particular users and applications than others based on their behavior, may be generated from these recorded actions through analysis and machine learning by the social networking system. In one embodiment, a user may grant or deny the social networking system permission to collect and store data related to the user.

A social networking system may also infer information about its users. For example, a social networking system may analyze content provided by users to identify keywords. Location information may also be gathered from content items posted by users to infer location of the user. As a result, a social networking system may infer certain profile attributes of a user, such as geographic location, educational institutions attended, and age range, by analyzing the user's connections, their declared profile information, and/or their posted content item. Inferring profile attributes is further discussed in U.S. application Ser. No. 12/916,322, filed on Oct. 29, 2010, which is hereby incorporated by reference in its entirety.

Social networking system users may also explicitly express interest in a concept, such as a celebrity, a hobby, a sports team, a book, music, and the like. These interests may be used in a variety of ways, including targeting advertisements and selecting stories about other users of the social networking system based on shared interests. In one embodiment, a social networking system computes affinity scores for users' interests either explicitly expressed or otherwise inferred on the social networking system and uses affinity scores to rank content items for presentation to users via a news feed or other communication channel. News feed rankings based on affinity scores is further discussed in U.S. application Ser. No. 13/194,770, filed on Jul. 29, 2011, and U.S. application Ser. No. 13/194,773, filed on Jul. 29, 2011, both which are hereby incorporated by reference in their entirety.

Based on stored information about its users, a social networking system may generate and maintain a social graph, which includes nodes connected by edges. Nodes include users and objects of the social networking system, such as web pages embodying concepts and entities, and edges represent connections between the users and/or objects represented by nodes. For example, edges represent a particular interaction between objects or users represented by two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites. Enabling third-party developers to define custom object types and custom action types is further described in U.S. application Ser. No. 13/239,340 filed on Sep. 21, 2011, which is hereby incorporated by reference in its entirety.

Third-party developers may allow social networking system to users to perform actions involving web pages or applications hosted external to the social networking system (e.g., express a preference or an interest in a page external to the social networking system). These web pages may be represented as page objects in the social networking system by embedding a widget, a social plug-in, programmable logic or a code snippet into the web pages (e.g., an iframe). Hence, any concept that may be embodied in a web page may become a node in the social graph on the social networking system. This allows the social networking system to record interactions by social networking system users with objects external to the social networking system. These interactions with external objects may be stored by the social networking system as an edge.

To notify its users of interactions performed by other users, the social networking system may generate stories identifying a user and an action performed by the user. One or more objects on which the action was performed may also be identified by the story. The social networking system may present a user stories identifying other users connected to the user. In one embodiment, the stories are presented to the user in a news feed, which may present the stories to the user in a reverse chronological order or other suitable order. The stories may alternatively be presented to the user via any other suitable communication channel.

However, as users become connected to an increasing number of other users, the number of stories presented to a user may be come unwieldy. While ranking content items according to users' interests and affinities for other users helps mitigate this problem, organizing stories presented to the user in various sections based on a category associated with the stories further simplifies user identification of stories. Stories generated by the social networking system are displayed in news feed sections each display stories associated with one or more categories. In one embodiment, each story may be associated with one or more topics, and a category includes one or more topics. Stories are included in a category if a topic associated with the story and a topic in the category match. In different news feed sections, stories may be provided in a stream format, where stories are consecutively displayed in a horizontal or vertical stream. Mechanisms may be used by a social networking system to manage the display of content in a newsfeed section displayed in a stream format, as further described in U.S. patent application Ser. No. 13/421,786, filed on Mar. 15, 2012, which is hereby incorporated by reference in its entirety. Including stories having the same, or a similar, category in a section allows a user to more easily identify certain types of stories. Simplifying story identification encourages users to remain engaged with the social networking system as the number of stories presented to the users increases.

In one embodiment, the size of the display used to present the newsfeed may be used in determining the layout of the news feed. Alternatively, the resolution of the display device used to present the news feed may be used in determining the news feed layout. Additionally, the size of a story presented via the news feed may depend on the relevance of affinity for the story by the user being presented with the news feed. For example, stories for which the user has a higher affinity may have an increased size, while stories for which the user has a lower affinity may have a decreased size. The category including a displayed story may also affect the layout of a news feed section or story within a news feed section.

FIG. 1 illustrates block diagram of one embodiment of a system for categorizing stories generated for presentation to social networking system users. As described above, a social networking system 100 generates stories describing actions performed by users of the social networking system 100. The social networking system 100 uses different types of information about users to categorize the generated stories for users, including user profile objects 102, an action log 104, and edge objects 106. Each user of the social networking system 100 is associated with a specific user profile object 102, which includes declarative information about the user that was explicitly shared by the user and may include information inferred by the social networking system 100. In one embodiment, a user profile object 102 may include various number of data fields, each describing an attribute of the corresponding user of the social networking system 100.

Social networking system users may take actions that are recorded by the social networking system 100 and that may be associated with one or more objects. Information describing these actions is stored in the action log 104. Many different types of interactions occurring within the social networking system 100 are recorded in the action log 104. Examples of interactions within the social networking system 100 recorded in the action log 104 include commenting on a photo album, transmitting data between users, becoming a fan of a musician, and adding an event to a calendar. Additionally, the action log 104 records a user's interactions with advertisements on the social networking system 100 as well as other applications operating on the social networking system 100.

Edge objects 106 store information about users' connections to other users or objects in the social networking system 100. An edge object may describe an interaction between a user and an object, such as a posting on a page maintained by the social networking system, a comment on a photo, a geographic location where a user was tagged, and a photo in which in the user was tagged. In one embodiment, an edge object 106 includes information about the strength of the connection between a user and an object or another user, such as an affinity score. If a user has a high affinity score for a particular additional user or object, the social networking system 100 has recognized that the user interacts highly with that additional user or object. Computation of affinity scores is further described in U.S. application Ser. No. 12/978,265, filed on Dec. 23, 2010, which is hereby incorporated by reference in its entirety.

The news feed manager 110 generates stories to be displayed in the news feed of a user. Stories may be generated based on both direct connections and soft, or indirect, connections to other entities and actions on the social networking system 100. A story may include references to one or more content items, or objects, with which social networking systems have interacted. Each of the generated stories is tagged with a topic and/or assigned to a category based on the content, source, and interactions with the story. A story may also include an aggregation of actions performed by one or more users of the social networking system 100, such as miles ran, songs listened to, stories shared, and so forth. Each story may include one or more graphic images of different sizes. A story may be displayed across several columns in a multiple-column display of the news feed generated by the social networking system 100.

When a viewing user device 108 loads a news feed user interface 118, the news feed manager 110 of the social networking system 100 receives a request for stories and may render a link in the news feed user interface 118 indicating stories that have accumulated since a prior request was received. This allows the news feed user interface 118 to identify stores generated or selected since the last time the user accessed a news feed. In one embodiment, the news feed manager 110 determines that the user associated with the viewing user device 108 is actively engaged with the news feed interface 118 and automatically updates the news feed user interface 118 with news feed stories 112 selected from a ranking generated by a news feed ranking module 114. In another embodiment, the news feed manager 110 may update the news feed user interface 118 with a news feed story 112 based on past interactions by the user associated with the viewing user device 108.

Alternatively, the news feed manager 110 may update the news feed user interface 118 to indicate an updated number of new stories that have been accumulated and await user input to display the new news feed stories 112. Examples of an input include a mouse click, a touchpad or touch-sensitive display input, a voice input, a gesture input, a keyboard input, or any other suitable input. A "click" action may be defined as any user input used to select and execute a link. In one embodiment, the news feed manager 110 dynamically renders the news feed stories 112 in a ranking determined by the news feed ranking module 114 based on user input received from the news feed user interface 118 on the viewing user device 108.

The news feed user interface 118 includes one or more news feed sections each including generated stories having the same, or a similar, category or topics. In one embodiment, a plurality of news feed sections may be arranged vertically in the news feed user interface. The number of sections and the categories which news feed sections are based on may be initially specified by default values. In one embodiment, the news feed sections, and the categories which they include, presented to a user are dynamically changed based on the connections of the user and the logged user actions. Additionally, the user may explicitly define news feed sections and/or the story categories included in a news feed section. In one embodiment, the news feed user interface 118 displays a related content unit adjacent to the news feed sections. The related content unit presents supplemental content generated based on the news feed sections, or stories within those sections, to the user.

In one embodiment, the news feed manager 110 receives information describing the display resolution of the viewing user device 108 and modifies the layout of the news feed user interface 118 accordingly. Alternatively, the news feed manager 110 may modify the news feed user interface 118 based on received information about the size of the display allocated to presenting the news feed user interface 118. For example, the news feed manager 110 may modify the number of columns and/or rows used by the news feed user interface 118 to present stories.

System Architecture

Figure 2:
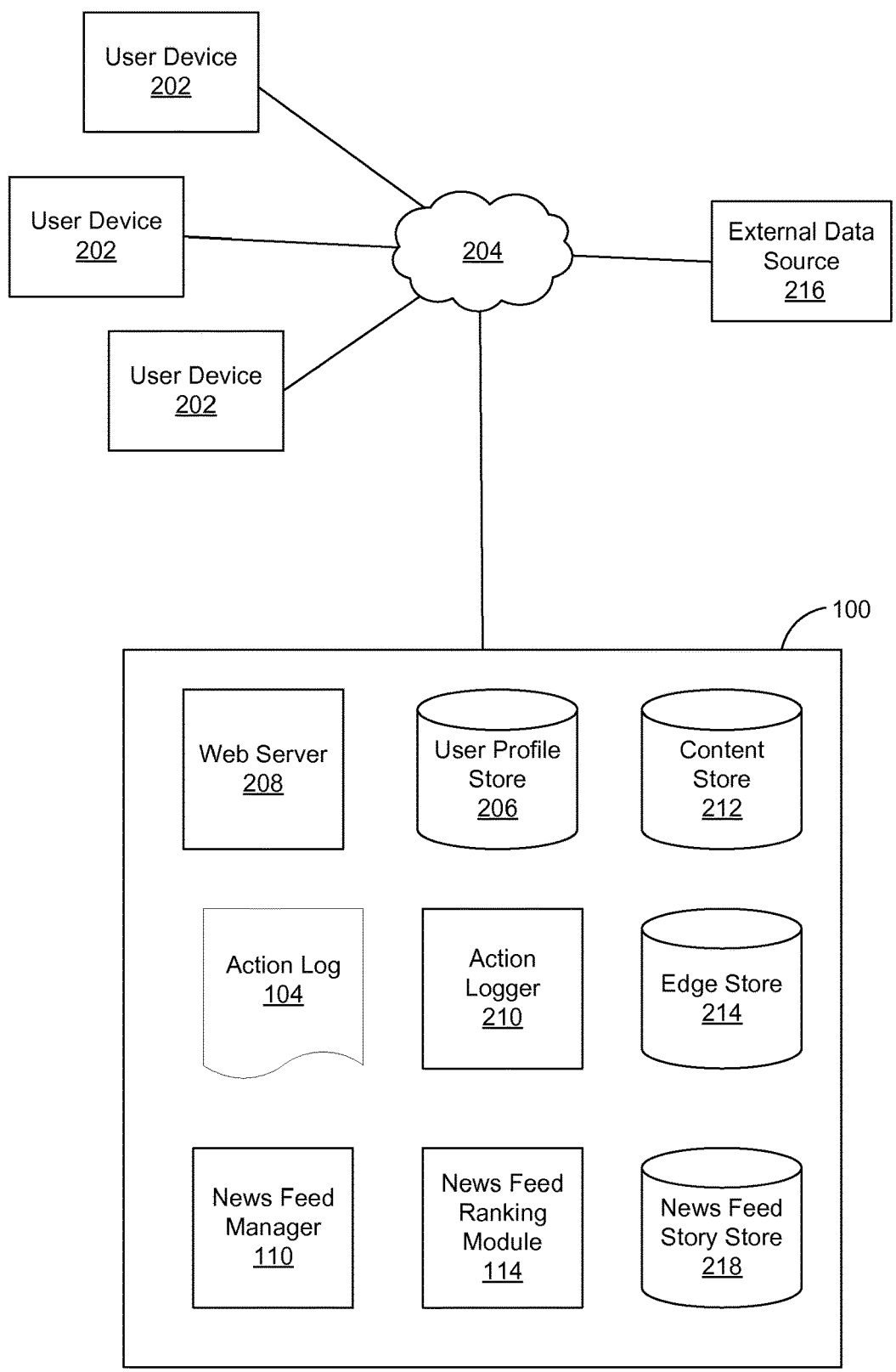
FIG. 2 is a block diagram illustrating a system environment including a social networking system, in accordance with an embodiment of the invention.

FIG. 2 is a block diagram of one embodiment of a system environment including a social networking system 100. The system environment comprises one or more user devices 202, the social networking system 100, a network 204, and external data source 216. In alternative configurations, different and/or additional modules can be included in the system environment.

A user device 202 is one or more computing devices capable of receiving user input as well as transmitting and receiving data via the network 204. In one embodiment, the user device 202 is a conventional computer system executing an operating system. In another embodiment, the user device 202 is a device having computer functionality, such as a personal digital assistant (PDA), mobile telephone, smart-phone, etc. The user device 202 may execute an application, for example, a browser application, to allow a user of the user device 202 to interact with the social networking system 100. In another embodiment, the user device 202 interacts with the social networking system 100 through an application programming interface (API) that runs on a native operating system of the user device 202, such as IOS® or ANDROID™.

In one embodiment, the network 204 uses standard communications technologies and/or protocols. Thus, the network 204 may include communication links using technologies such as Ethernet, 802.11, worldwide interoperability for microwave access (WiMAX), 3G, 4G, code division multiple access (CDMA), digital subscriber line (DSL), etc. Similarly, the networking protocols used on the network 204 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). Data exchanged over the network 204 can be represented using technologies and/or formats including the hypertext markup language (HTML) and the extensible markup language (XML). In addition, all or some of the communication links can be encrypted using conventional encryption technologies such as secure sockets layer (SSL), transport layer security (TLS), and Internet Protocol security (IPsec). One or more external data sources 216 communicate data with the social networking system 100 and/or with a client device 202 via the network 204.

The social networking system 100 shown by FIG. 2 includes a user profile store 206, a web server 208, an action logger 210, an action log 104, a content store 212, an edge store 214, a news feed manager 110, a news feed ranking module 114, a news feed categorizer 122, and a news feed story store 218. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as JAVA®, FLASH®, XML, and so forth. The web server 208 may receive and route messages between the social networking system 100 and one or more user devices 202, for example, instant messages, queued messages (e.g., email), text and SMS (short message service) messages, or messages sent using any other suitable messaging technique. The user may send a request to the web server 208 to upload information, for example, images or videos that are stored in the content store 212. Additionally, the web server 208 may provide API functionality to send data directly to native user device operating systems, such as IOS®, ANDROID™, WEBOS®, or RIMO.

The action logger 210 receives communications from the web server 208 describing user actions internal to or external to the social networking system 100 and populates the action log 104 with information about the user actions. Such actions may include, for example, adding a connection to another user, sending a message to another user, uploading an image, reading a message from another user, viewing content associated with another user, attending an event, among others. In addition, a number of actions described in connection with other objects are directed at particular users, so these actions are associated with those users as well.

The action log 104 tracks user actions on the social networking system 100 as well as external data sources 216 that communication information back to the social networking system 100. Users may interact with various objects on the social networking system 100, including commenting on posts, sharing links, and checking-in to physical locations via a mobile device. In one embodiment the action log 104 also includes user actions from external data sources 216. Examples of an external data source 216 include web sites, music applications, video applications, or other services to which the user provides data. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log 104 records data about these users, including viewing histories, advertisements that were clicked on, purchasing activity, and buying patterns. Similarly, a music playing application may log which songs are listened to by a user of the social networking system and enable the action log 104 to record this data about the user. In one embodiment, permission is requested from the user to track and/or store data about the actions of the user in action log 104.

User account information and other related information for users are stored as user profile objects 108 in the user profile store 206. The user profile information stored in a user profile object 108 describes a corresponding user of the social networking system 100. Examples of information included in a user profile object 108 include biographic, demographic, and other types of descriptive information, such as work experience, educational history, gender, hobbies or preferences, location, and the like. A user profile object 108 may also store other information provided by the user, for example, images or videos. In certain embodiments, images of users may be tagged with identification information of users of the social networking system 100 displayed in an image. The user profile store 206 also maintains references to the actions stored in the action log 104 and performed on objects in the content store 212.

The edge store 214 stores the information describing connections between users and other objects on the social networking system 100 as edge objects 110. Some connections may be defined by users, allowing users to specify their relationships with other users. For example, users may generate connections with other users that parallel the users' real-life relationships, such as friends, co-workers, partners, and so forth. Other connections are generated when users interact with objects in the social networking system 100, such as expressing interest in a page ("liking" the page) on the social networking system 100, sharing a link with other users of the social networking system 100, and commenting on posts made by other users of the social networking system 100.

The edge store 214 stores edge objects 110 that include information about the connections, such as affinity scores for objects, interests, and other users. Affinity scores may be computed by the social networking system 100 over time to approximate a user's affinity for an object, interest, and other users in the social networking system 100 based on the actions performed by the user. Computation of affinity scores is further described in U.S. application Ser. No. 12/978,265, filed on Dec. 23, 2010, which is hereby incorporated by reference in its entirety. Multiple interactions between a user and a specific object may be stored in one edge object 110 in the edge store 214, in one embodiment. For example, a user that plays multiple songs from Lady Gaga's album, "Born This Way," may have multiple edge objects for the songs, but only one edge object for Lady Gaga.

The news feed manager 110 generates and categorizes news feed stories describing actions performed by social networking system users. A category of a story may be determined based on the type of content in the story or the content of the story itself. In one embodiment, a category is defined to include a plurality of topics. For example, a "Politics" category may include the topics "Democrat," "Republican," and "election." Topics may be inferred from content received by the social networking system 100 without explicit designation from a user. Inferring topics from received content is further discussed in U.S. application Ser. No. 13/167,701, filed on Jun. 24, 2011, which is hereby incorporated by reference its entirety. For example, the news feed manager 110 stores associations between topics and categories and compares topics extracted from content included in a story to the stored associations; a story having a topic matching a topic associated with a category is included in the category. News feed sections may include stories from a combination of categories and topics. In one embodiment, a term may be defined as both a category and a topic, with a category including one or more topics in addition to the primary topic of the category.

The news feed manager 110 may retrieve news feed stories stored in the news feed story store 218 to determine a story layout of the news feed stories 112. The news feed manager 110 may generate a "cluster" story including multiple news feed stories about a topic, such as the New York Knicks, or stories clustered around an event, such as the Super Bowl. The news feed manager 110 may also aggregate incoming newsfeed stories 112 with previously presented news feed stories 116 to generate a "cluster" story such as "9 friends are in the Mission" with an image uploaded by one of the users in a check-in event. Other types of cluster stories include an update of friends, or other users of the social networking system 100 connected to a viewing user, that now live in a specific city, such as New York, N.Y. This current location update story may rely on different types of content items, such as status messages uploaded from a mobile user device that attached geographic location coordinates to the status messages, check-in events at locations, changed addresses declared in user profiles, uploaded pictures with embedded geographic location coordinates, and so forth.

Another type of cluster story is an "around me" story including different news feed stories of other users connected to a user viewing the news feed (a "viewing user") associated with locations within a threshold distance of the viewing user's current geographic location. For example, a viewing user may check-in at the Eiffel Tower in Paris, France. Accordingly, the news feed manager 110 may retrieve new news feed stories generated by other users connected to the viewing user that are near the Eiffel Tower, such as check-ins at a nearby café, museums, and other landmarks.

The news feed manager 110 may also use a ranking algorithm of the news feed ranking module 114 to determine the size and dimensions of stories for placement within a news feed user interface. For example, a highly relevant story that clusters multiple incoming news feed stories about a famous celebrity may be highly ranked for a viewing user based on affinity scores and the ranking algorithm of the news feed ranking module 114. Hence, the size of the cluster story within the news feed user interface may be larger than other, less relevant, stories.

In addition, the news feed manager 110 may also incorporate the size of the story into the ranking algorithm of the news feed ranking module 114. For example, a graphic image included in a story may affect the size used to present the story. A high quality graphic image may make a story larger than another story with a lower quality graphic image. The ranking performed by the news feed ranking module 114 may also incorporate the size of a story in ranking incoming news feed stories.

The news feed manager 110 selectively provides generated stories to users. News feed stories generated for a user by the news feed manager 110 are ranked by the news feed ranking module 114. The ranked and categorized stories are stored in the news feed story store 218. The news feed manager 110 may provide content to user devices 202 through the web server 208 and network 204.

Figure 3:
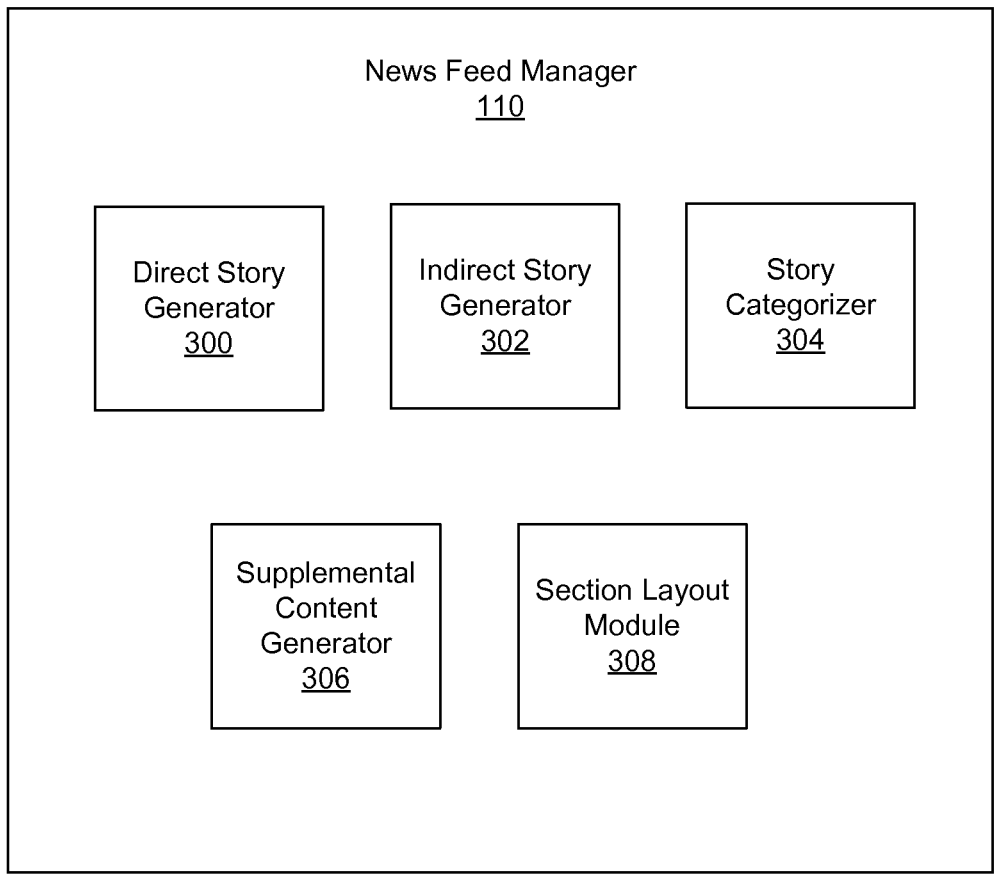
FIG. 3 illustrates a diagram of a news feed manager of a social networking system, in accordance with one embodiment.

Selecting Content to Provide to Users of a Social Networking System in News Feed Sections FIG. 3 illustrates a block diagram of one embodiment of the news feed manager 110. The news feed manager 110 generates stories for inclusion in a news feed and transmits the stories to be displayed in a categorical news feed on a user device. A news feed story may describe objects represented in the social networking system, for example, an image, a video, a comment from a user, status messages, external links, content generated by the social networking system, applications, games, or user profile. In the embodiment shown by FIG. 3, the news feed manager 110 includes a direct story generator 300, an indirect story generator 302, a story categorizer 304, a supplemental content generator 306, and a section layout module 308. These modules may perform in conjunction with each other or independently to selectively provide content to users of a social networking system 100.

The direct story generator 300 module generates stories for potential inclusion in a news feed section. A direct story is generated based on a direct connection between a user and another user, entity or action. For example, direct stories are generated for a user based on actions taken by another user of the social networking system connected to the user. Actions from which direct stories may be generated include updating a status, checking in at a location with a mobile device, and shared links from friends. Direct stories may also be generated based on a post by an application authorized to post on a user's behalf. For example, a direct story may be generated if a friend listened to a song through a music listening service configured to report listening data to the social networking system.

Similarly, the indirect story generator 302 module generates stories for potential inclusion in a news feed section. An indirect story is generated for a user based on a "soft" connection between an action performed on the social networking system 100 and the user. For example, a post from a restaurant entity that a user connected to the user has checked in to may result in a story being generated for the user even though the user is has not "liked" or otherwise created a connection directly between the user and the restaurant. Hence, an indirect story may describe an action by an entity to which a user is not connected but that is associated with an entity to which the user is connected.

In one embodiment, a story generated for a user is classified as a direct story or an indirect story based on the affinity score between the user and the entity or user performing the action described by the story. For example, the social networking system sets an affinity threshold and a story is determined to be a direct story or an indirect story by comparing the affinity score between the user and the entity or user performing the action described by the story with the affinity threshold. In one embodiment, different affinity thresholds may be associated with different users based on based on the users' range and concentration of affinity scores with other users or entities to which they are connected.

The story categorizer 304 organizes generated stories into a plurality of categories for display in a news feed. In one embodiment, the story categorizer 304 performs word matching to tag a story as relating to one or more topics. Stories may be categorized without explicit action from a user for categorizing. Inferring topics associated with a story based on the content of the story is further described in U.S. application Ser. No. 13/167,701, which is hereby incorporated by reference in its entirety. Further, stories may be categorized without mentioning a topic by name. For example, a story containing a link to a music video may be automatically tagged with the topics "Rock," "Music," "Video," "The Rolling Stones," and "Mick Jagger" based on attributes of the video. Topics may also describe other, in some cases broader, categories including "Musician," "Government Organization," "Non Profit," and "Public Figure." In one embodiment, a story may be tagged with multiple topics, or a single more general category. A category may include a plurality of topics, allowing a news feed section to include stories having combination of categories and topics.

The supplemental content generator 306 generates supplemental content for presentation in a related content unit. Supplemental content may be generated based on individual stories generated for a user or the categories or topics included in a news feed section. In one embodiment, a set of supplemental content is generated for each news feed section of a user, and is displayed in a related content unit alongside the associated news feed section while the user is viewing the associated news feed section. Various types of supplemental data may be included in a related content unit. For example, the supplemental content includes leader board data (e.g., the number of friends who have listened to song). As another example, the supplemental content may include a recommended action to encourage additional interaction with the social networking system 100 or may include advertisements related to the associated news feed section.

The section layout module 308 generates a number of news feed sections, each of which is associated with one or more categories or topics. Stories associated with a category or topic associated with a section are displayed using the section. In one embodiment, the section layout module 308 determines what type of device the user viewing the news feed is accessing the news feed from. The sections included in the news feed, as well as the format of the sections in the news feed, can be modified based on the type of device that the user is requesting and accessing the news feed from. For example, if the user is viewing the news feed from mobile device, the format and content of the news feed sections may be modified to accommodate a potentially smaller screen. The number of sections and the categories on which news feed sections may initially be based on default values. In one embodiment, the news feed sections presented to a user are dynamically changed based on the connections of the user and the logged actions associated with the user. For example, the section layout module 308 generates a set of candidate news feed sections that may be present in any user's news feed. The candidate news feed sections may include games, music, entertainment, local, news, close friends, family, photos, and subscriptions. A subset of the candidate news feed sections are displayed in any user's news feed sections based on how much activity they have had associated with each of the candidate sections. For example, a user who has not liked any local businesses and has no local posts is less likely to have a local news feed section in their news feed. On the other hand, the news feed of a user who has a music playing application and has liked a significant number of musicians is likely to include a music news feed section. In addition, the section layout module 308 may allow the user to explicitly define news feed sections and/or the categories contained in a news feed section. The categorized stories generated for a user are allocated to one of the user's news feed sections based on the categories or topics assigned to a story.

In one embodiment, one or more categories are assigned to each news feed section. The categories may each be associated with a plurality of subset topics. For example, a news feed section may include the category "sports," which is associated with the subset topics "baseball," "basketball," "San Francisco 49ers," and "football". If a generated story has been tagged with one or more of the category or subset topics comprising the category, the generated story is included the news feed section associated with the category. In one embodiment, certain tagged topics will result in the corresponding story being mapped to an associated news feed section. For example, stories tagged with "Musician" are automatically placed in the "Music" news feed section. If a tagged topic or category is not specific enough to be mapped directly to a certain news feed section, the section layout module 308 compares keywords present in the story or posted by entities associated with the story. For example, the keywords of a story tagged as "Person" are compared with keywords often produced by stories or entities tagged with categories that are mapped to a news feed section including "Musician," "Record Company," "Song writer," etc. In one embodiment stories are assigned to the news feed section associated with the category having the most similar keywords. Additionally, if a story is tagged with categories or topics associated with multiple news feed sections, the story may be included in all, some, or none of the news feed sections. In one embodiment, determination of a news feed section including a story tagged with categories or topics associated with multiple news feed sections is based on the number of categories or topics which the story and news feed sections have in common. Additional news feed sections may be dynamically generated for a user if one or more stories are not associated with an existing section and have at least a threshold ranking from the news feed ranking module 114.

A variety of sections may be included in a user's news feed. In one embodiment, the sections that are included in a user's news feed are determined based in part on the current geographic location of the user. For example, a request from a user for a news feed while the user is on mobile device may include identification of where the user is currently located. The sections included in the user's news feed can then be selected based on whether the user is at work or home, whether the user is traveling, whether the user is an a country with primarily a different language than the user's default language, the stores and services that are available near the user's location, etc. The following are examples of possible news feed sections and potential corresponding direct stories, indirect stories, and supplemental content. An overall news feed section may function similar to a conventional news feed and include stories based on their ranking. In one embodiment, the ranking is biased towards direct stories from users for which a viewing user has at least a threshold affinity. Supplemental content may include birthdays and upcoming events. A close friends section may include any activity from users connected to the viewing user and designated as close friends or having at least a threshold affinity score. Supplemental content for the close friends section may include a list of current close friends and suggestions of other users to add as close friends.

A community news feed section may be displayed for stories related to groups a viewing user has joined. A single community section may be displayed for all groups, or multiple community sections, each associated with one or more groups the viewing user has joined, may be displayed. Examples of direct stories for a community section include posts from a member of a group associated with the community section, including posts with group-only privacy that the user has permission to see.

A local news feed section displays stories related to the viewing user's current location, place of work, home location, or other locale. Examples of direct stories that may be included in a local news feed section include check-ins from friends within a threshold distance of a location or posts from nearby businesses that the viewing user has liked or where the viewing user has previously checked-in. Examples of indirect stories include posts from popular local business where users connected to the viewing user have checked-in or news stories that have been disproportionally liked by people associated with the location associated with the viewing user. The supplemental content accompanying local section may include a map identifying recent popular check-ins of all users within a threshold distance of a location associated with the viewing user or events within the threshold distance of the location associated with the viewing user. In one embodiment, the supplemental content identifies these events or locations as pins on a map.

A news section may display articles from news web sites that have been shared or liked by friends of the viewing user as a direct story. An indirect story in the news section may include links shared by news sources that are "liked" by the user's friends. Examples of supplemental content accompanying the news section include trending topics an increasing number of users have mentioned or shared, topics referenced, liked, or shared by a threshold number of users, uniform resource locators (URLs) more popular in a geographic region associated with the viewing user than in a wider area, URLs having highest number of likes, comments, or shares by users connected to the viewing user, and most shared articles on a particular domain that the viewing user has "liked."

A video section displays direct stories that may include links to videos shared by users connected to the viewing user or from pages the viewing user has liked. In one embodiment, the video section does not include links to videos associated with musicians. Posts generated by an entity associated with a television show or movie the viewing user has liked may also be included as direct stories. Indirect stories in the video section may include stories of users connected to the viewing user liking an entity associated with a television shows or a movie or shares of content associated with a television show or a movie the viewing user has liked by users connected to the viewing user. Supplemental content for the video section may include videos that are more popular in the user's city than wider region, videos that are currently more popular than in the past, videos having a highest number of likes, comments or shares by users connected to the viewing user and/or users connected to a user connected to the viewing user, and video URLs ranked by the number of shares.

A music section displays direct stories that may include posts from musicians the viewing user as liked or listened to, posts from users connected to the viewing user mentioning entities in a musician category, posts from concert venues near the viewing user, posts about musicians the viewing user has listened to or has liked. Indirect stories may indicate songs friends listened to by users connected to a user connected to the viewing user or stories of users connected to the viewing user liking a new musician or band. Supplemental content accompanying the music section may identify songs to which users connected to the viewing user are currently listening, new album releases connected to a musician the viewing user has liked, songs a user connected to the viewing user has frequently listened to or otherwise identified using a music listening service, songs with the most listens in a certain time period within a geographical region, and music videos tagged with musicians the viewing user has listened to or has liked.

A photos section may include photos uploaded by users connected to the viewing user or having users connected to the viewing user tagged as direct stories. Photos tagged by users connected to the viewing user may be designated indirect stories. Supplemental content to accompany the photos section may include recent cover photo or profile photo changes by users connected to the viewing user.

A games section may include stories listing a game that has been played by a user connected to the viewing user as a direct story. Posts from entities having a category of "game" may be included as an indirect story. Supplemental content may include pending requests from users connected to the viewing user in a turn based game and recommended games based on games played by users connected to the viewing user.

In one embodiment, a news feed section may be limited to displaying a certain percentage of direct stories and/or indirect stories. For example, a news feed section may be limited to displaying less than 30% indirect stories to ensure the displayed stories remain useful and relevant to the user. Similarly, for example, a news feed section may be limited to displaying at least 10% indirect stories to expand a user's connections with other entities in the social networking system 100.

Figure 4:
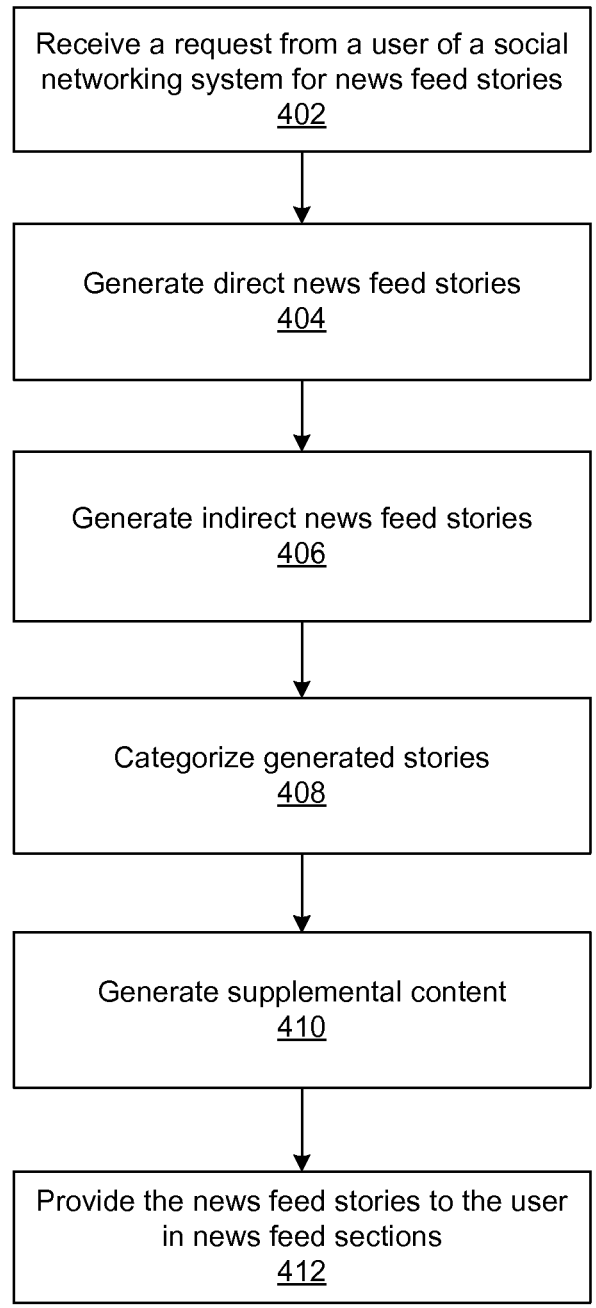
FIG. 4 is a flowchart of a process for providing categorized stories in a news feed display to a viewing user of a social networking system, in accordance with an embodiment of the invention.

FIG. 4 is a flowchart of one embodiment of a process for providing content categorized stories in a news feed display to a viewing user of a social networking system 100. A request for news feed stories is received 402 from the viewing user. The request may be an application programming interface (API) call from a mobile device application requesting content for a news feed user interface. Alternatively, the request may be received 402 as a web page request for content in a news feed user interface displayed on a browser window operating on the user device.

Based on the received request, direct news feed stories are generated 404. In one embodiment, the direct news feed stories are generated 404 based on activities by users directly connected to the viewing user. Indirect news feed stories are also generated 406 for the viewing user. In one embodiment, the indirect news feed stories are generated based on activities by users not directly connected to the viewing user; the activities used to generate 406 indirect news feed stories may involve a user directly connected to the viewing user, although not performed by a user directly connected to the viewing user The generated news feed stories are categorized 408 based on their source, content, and associated social interactions. In one embodiment, a story may be tagged with a plurality of categories or topics, as described above in conjunction with FIG. 3. Supplemental content is generated 410 for a user based on the sections included in the news feed for the viewing user. Supplemental content may be generated based on individual stories generated for the viewing user or based on the categories or topics on which a news feed section of a user is based. In one embodiment, a set of supplemental content is generated for each news feed section of the viewing user. The supplemental content may be displayed as related content unit presented proximate to the associated news feed section while the user is viewing the associated news feed section. In one embodiment, supplemental content is displayed adjacent to a news feed section with which the viewing user most recently interacted. The generated and categorized news feed stories are provided 412 to the user after being organized into news feed sections.

Figure 5:
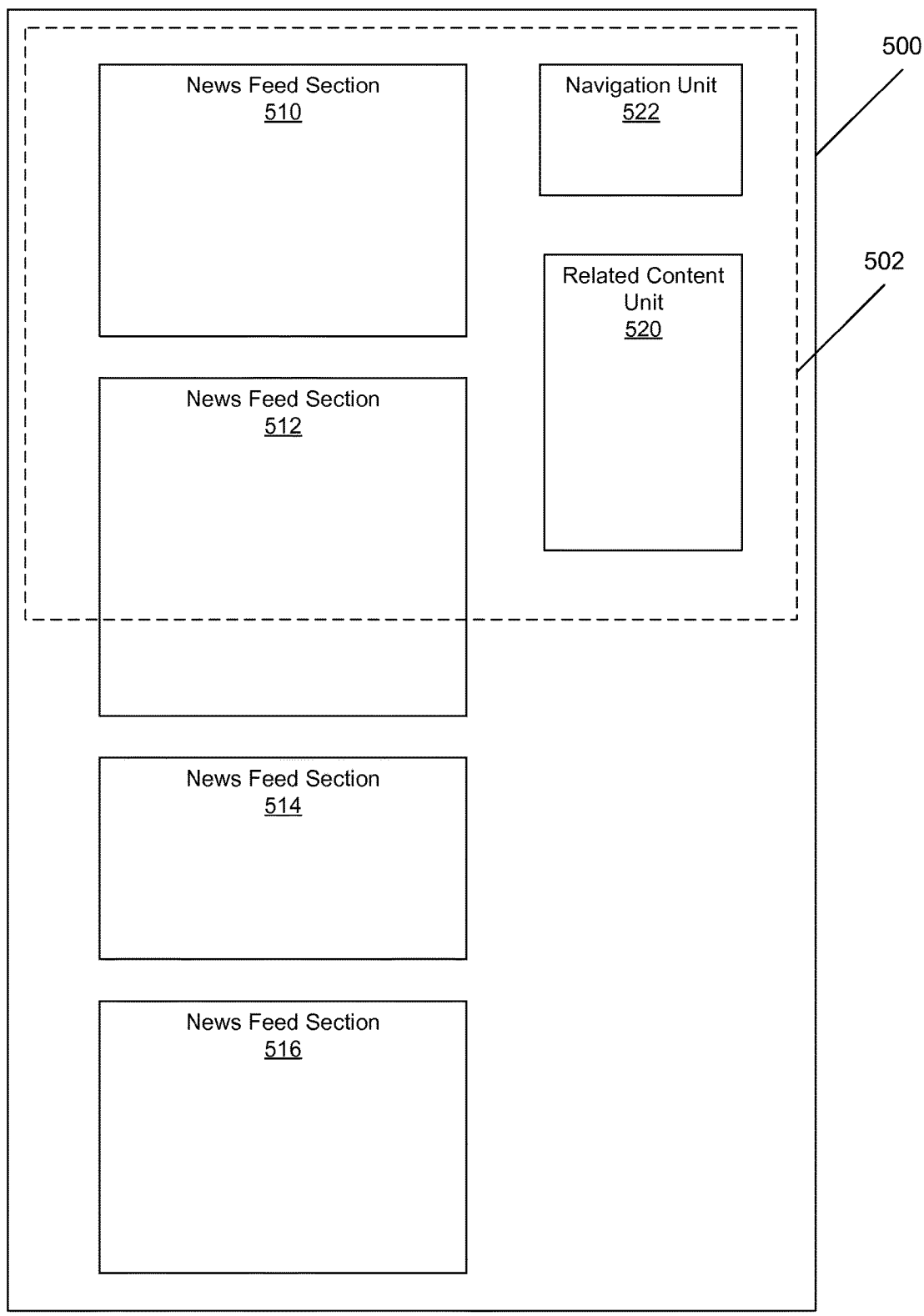
FIG. 5 is an example of a user interface providing a categorized news feed display, in accordance with an embodiment of the invention.

FIG. 5 is an example of a user interface providing content to a viewing user of a social networking system in a categorized news feed display. As shown in FIG. 5, the page content 500 includes all content generated by the social networking system that may be viewable to the user. The viewable area 502 represents the portion of the page content 500 viewable to the user at a given time because of the resolution and/or size of the display device on a user device. The user may move the viewable area 502 by scrolling vertically and/or horizontally to view different portions of the page content 500. In one embodiment, additional content, such as additional sections, may be added to the bottom of the page content 500 as the viewable area 502 nears the bottom of the page content 500.

News feed sections 510-516 are each associated with one or more story categories and display a plurality of stories. For example, news feed sections 510, 512, 514, and 516 may display stories related to videos, photos, music, and news respectively. In one embodiment, social networking system also allows the user to scroll vertically in each of news feed section, in addition to scrolling through all of the page content 500. Additional stories may be added to the bottom of the plurality of stories displayed in a section as the user scrolls through the stories in the section and nears the end of the stories displayed in the section.

In one embodiment, a navigation unit 522 is displayed in the viewable area 502 that identifies news feed sections that are included in the page content 500 and provides links for viewing each of the sections. For example, the navigation unit 522 includes a link to the category of section 514, e.g., photos. As section 514 is currently not included in the viewable area 502, the navigation unit 522 both notifies the viewing user of available sections and allows the viewing user to quickly access an available section. Selecting a link of the navigation unit 522 displays the section corresponding to the selected link in the viewable area 502. In one embodiment, interacting with a link to a section in the navigation unit 522 causes the viewable area 502 to scroll to include the associated section.

The related content unit 520 displays supplemental content generated for the viewing user. The supplemental content is related to and based on the sections 510-516 and the stories within the sections. In one embodiment, the supplemental content is generated based on which sections are viewable within the viewable area 502. The supplemental content shown in the related content unit 502 may be dynamically altered as different sections are shown in the viewable area 502. In one embodiment, the related content unit 520 displays supplemental content related to whichever of the sections was most recently interacted with by the viewing user. Examples of interaction with a section includes scrolling within a section, "liking" a story in a section, posting a comment to a story in a section, etc. The related content unit 520 may also include advertisements selected based on the displayed sections, stories, or actions performed by the viewing user. In one embodiment, the navigation unit 522 and/or related content unit "float" alongside the news feed sections so they remain visible as the portion of the page content 500 presented in the viewable area 502 changes.

Each news feed story included in the categorized news feed may include options for the viewing user to interact with the news feed story. Examples of interactions with a news feed story include expressing approval of the news feed story by "liking" it, commenting on the news feed story, and sharing the sharing news feed story with other users of the social networking system connected to the viewing user. Some news feed stories may also include an indication of other users also expressing interest in the news feed stories. For example, names of users connected to the viewing user expressing interest in a story as well as a total number of users expressing an interest in the story may be displayed. While not shown in FIG. 5, page content 500 may also include an incoming news feed stories link indicating to the viewing user that additional news feed stories that are ready for presentation to the viewing user; the additional stories may be displayed based on a request from the viewing user. An incoming news feed stories link may indicate that additional stories are available for the news feed as a whole or that individual incoming news feed links may be provided for each of the news feed sections. This link may dynamically appear as a pop-up window or as an element within a user interface for the social networking system.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, from a viewing user device of a viewing user, a request for content of a news feed to be presented by a news feed user interface, the news feed including a plurality of news feed sections for presenting a plurality of newsfeed stories describing actions performed by other users in a social networking system, the newsfeed stories generated based in part on activities logged by the social networking system and including at least a direct story and an indirect story, each news feed section associated with one or more categories associated with topics of the newsfeed stories;
generating a plurality of direct stories based on direct connections between the viewing user and users directly connected with the viewing user in the social networking system, each direct story describing an activity performed by one of the users directly connected with the viewing user;
organizing, by the social networking system, the direct stories into categories, each category associated with one or more topics based in part on content of the direct stories;
determining, by the social networking system, the news feed sections based at least in part on the categories and the one or more topics;
associating, by the social networking system, each direct story with a news feed section associated with a topic matching at least one topic assigned to the direct story;
generating the news feed user interface including the of news feed sections and the direct stories organized into the categories by:
ranking the direct stories based on an affinity of the viewing user for an aspect of each direct story,
selecting a subset of the direct stories based at least in part on the ranking,
organizing the selected direct stories into groups based on news feed sections associated with the selected direct stories, each group including one or more direct stories and associated with one news feed section, and
determining a layout of the news feed sections by:
determining a dimensional size for each direct story based at least on the affinity of the viewing user for the aspect of each direct story, and
determining a dimensional size of each news feed section based on the dimensional sizes of the direct stories associated with the news feed section;
in response to the request, providing, by the social networking system, the news feed user interface to the viewing user device.

2. The method of claim 1, wherein each of the news feed sections is associated with a plurality of topics.

3. The method of claim 1, further comprising:
generating an additional news feed section associated with a topic assigned to a news feed story responsive to determining none of the plurality of news feed sections is associated with a topic matching the topic assigned to the news feed story.

4. The method of claim 1, wherein generating the direct stories comprises:
retrieving, from the activities logged by the social networking system, a plurality of activities performed by the users directly connected to the viewing user on the social networking system after receipt of a prior request from the viewing user for the news feed; and
wherein the direct stories are generated based on the retrieved plurality of activities.

5. The method of claim 1, further comprising assigning one or more topics to each of the direct stories based at least in part on users associated with the content of each direct story.

6. The method of claim 1, wherein the news feed user interface further includes a navigation unit, further comprising:
providing the navigation unit to the viewing user device, the navigation unit including links to access one or more of the news feed sections.

7. The method of claim 6, further comprising:
in response to receiving the viewing user's selection of a news feed section via the navigation unit, providing for display news feed stories associated with the viewing user's selection.

8. The method of claim 1, further comprising:
generating a plurality of indirect stories based on indirect connections between the viewing user and users indirectly connected with the viewing user in the social networking system, each indirect story describing an activity performed by one of the users indirectly connected to the viewing user in the social networking system, each indirect story generated based at least on a first logged activity having a common characteristic with a second logged activity that involves one of the users indirectly connected to the viewing user in the social networking system; and
associating each indirect story with a news feed section associated with a topic matching at least one topic assigned to an indirect story, wherein the news feed presented to the viewing user includes the plurality of indirect stories.

9. The method of claim 8, wherein associating each indirect story with the news feed section comprises:
associating less than a maximum percentage of indirect stories to at least one news feed section.

10. The method of claim 8, wherein associating each indirect story with the news feed section comprises:
associating at least a minimum percentage of indirect stories to at least one news feed section.

11. The method of claim 8, wherein a story is classified as a direct story type or as an indirect story type based on an affinity between the viewing user and a user performing an activity described by the story.

12. The method of claim 1, wherein generating the news feed user interface comprises:
    determining a device type of the viewing user device; and
    in response to determining that the viewing user device is a mobile device, modifying a format of the news feed user interface according to a screen of the viewing user device.

13. The method of claim 1, wherein determining a plurality of news feed sections and the associated one or more topics associated with each news feed section is based at least in part on a current geographic location of the viewing user.

14. The method of claim 1, further comprising:
    generating supplemental content for each of the plurality of news feed sections, the supplemental content for a news feed section based at least in part on the one or more topics associated with the news feed sections;
    wherein the news feed interface presents the news feed displaying the supplemental content associated with at least one news feed section.

15. The method of claim 14, wherein displaying supplemental content associated with at least one news feed section comprises:
    displaying supplemental content associated with a news feed section currently being viewed by the viewing user.

16. The method of claim 15, wherein a first portion of the displayed supplemental content is associated with a first news feed section and a second portion of the displayed supplemental content is associated with a second news feed section.

17. The method of claim 16, wherein the first portion of the displayed supplemental content is visible to the viewing user while the first news feed section occupies at least a threshold amount of a device screen of the viewing user device.

18. The method of claim 14, wherein displaying supplemental content associated with at least one news feed section comprises:
    displaying supplemental content associated with a news feed section with which the viewing user most recently interacted.

19. The method of claim 14, wherein the supplemental content for the news feed section includes aggregation of one or more activities performed by one or more users directly connected to the viewing user described by stories associated with the news feed section.

20. The method of claim 14, wherein the supplemental content for the news feed section is based at least in part on location data associated with the viewing user and locations associated with stories associated with the news feed section.

21. The method of claim 14, wherein the supplemental content includes advertisements related to a topic associated with the at least one news feed section.

22. The method of claim 1, wherein a dimensional size of a first new feed section corresponding to a first direct story is greater than a dimensional size of a second news feed section corresponding to a second direct story, the first direct story being ranked higher than the second direct story.

23. A computer-implemented method comprising:
    receiving, from a viewing user device of a viewing user, a request for content of a news feed to be presented by a news feed user interface, the news feed including a plurality of news feed sections for presenting a plurality of newsfeed stories describing actions performed by other users in a social networking system, the newsfeed stories generated based in part on activities logged by the social networking system and including at least a direct story and an indirect story, each news feed section associated with one or more categories associated with topics of the newsfeed stories;
    generating a plurality of direct stories describing activities performed by a plurality of users directly connected to the viewing user in the social networking system;
    organizing, by the social networking system, the direct stories into categories, each category associated with one or more topics based in part on content of the direct stories;
    determining, by the social networking system, the news feed sections based at least in part on the categories and the one or more topics;
    generating the news feed user interface including the news feed sections and the direct stories organized into the categories by:
        ranking the direct stories based on an affinity of the viewing user for an aspect of each direct story,
        selecting a subset of the direct stories based at least in part on the ranking,
        organizing the selected direct stories into groups based on news feed sections associated with the selected direct stories, each group including one or more direct stories and associated with one news feed section, and
        determining a layout of the news feed sections by:
            determining a dimensional size for each direct story based at least on the affinity of the viewing user for the aspect of each direct story, and
            determining a dimensional size of each news feed section based on the dimensional sizes of the direct stories associated with the news feed section;
    in response to the request, providing, by the social networking system, the news feed user interface to the viewing user device.

24. The method of claim 23, wherein generating the news feed user interface comprises:
    determining a device type of the viewing user device; and
    in response to determining that the viewing user device is a mobile device, modifying a format of the news feed user interface according to a screen of the viewing user device.

25. The method of claim 23, wherein determining a plurality of news feed sections and the associated one or more topics associated with each news feed section is based at least in part on a current geographic location of the viewing user.

26. The method of claim 23, further comprising:
    generating an additional news feed section associated with a topic assigned to a news feed story responsive to determining none of the plurality of news feed sections is associated with a topic matching the topic assigned to the news feed story.

27. The method of claim 23, wherein generating a plurality of direct stories comprises:
    retrieving, from the activities logged by the social networking system, a plurality of activities performed by the users directly connected to the viewing user on the social networking system after receipt of a prior request from the viewing user for the news feed; and
    wherein the direct stories are generated based on the retrieved plurality of activities.

28. The method of claim 23, further comprising assigning one or more topics to each of the direct stories based at least in part on users associated with the content of each direct story.

29. The method of claim 23, wherein the news feed user interface further includes a navigation unit, further comprising:
providing the navigation unit to the viewing user device, the navigation unit including links to access one or more of the news feed sections.

30. The method of claim 29, further comprising:
in response to receiving the viewing user's selection of a news feed section via the navigation unit, providing for display news feed stories associated with the viewing user's selection.

31. The method of claim 23, further comprising:
generating a plurality of indirect stories describing activities performed by a plurality of users indirectly connected to the viewing user in the social networking system;
wherein the plurality of news feed sections of the news feed user interface further include one or more of the plurality of indirect stories assigned with at least one topic matching a topic associated with the news feed section.

32. The method of claim 31, further comprising:
classifying each of the plurality of news feed stories as a direct story type or an indirect story type based an affinity score between the viewing user and a user performing an activity described by the news feed story.

33. The method of claim 31, wherein the plurality of direct stories and indirect stories presented in the news feed includes less than a maximum percentage of indirect stories in at least one news feed section.

34. The method of claim 31, wherein the plurality of direct stories and indirect stories presented in the news feed includes at least a minimum percentage of indirect stories in at least one news feed section.

35. The method of claim 23, further comprising:
generating supplemental content for each of the plurality of news feed sections, the supplemental content for a news feed section based at least in part on the one or more topics associated with the news feed sections;
wherein the news feed interface presents the news feed displaying the supplemental content associated with at least one news feed section.

36. The method of claim 35, wherein displaying supplemental content associated with at least one news feed section comprises:
displaying supplemental content associated with a news feed section currently viewed by the viewing user.

37. The method of claim 35, wherein displaying supplemental content associated with at least one news feed section comprises:
displaying supplemental content associated with a news feed section with which the viewing user most recently interacted.

38. The method of claim 35, wherein the supplemental content for the news feed section includes aggregation of one or more activities performed by one or more users directly connected to the viewing user described by stories associated with the news feed section.

39. The method of claim 35, wherein the supplemental content includes advertisements related to a topic associated with the at least one news feed section.

40. The method of claim 23, wherein a dimensional size of a first new feed section corresponding to a first direct story is greater than a dimensional size of a second news feed section corresponding to a second direct story, the first direct story being ranked higher than the second direct story.

* * * * *